United States Patent
Oettinger et al.

(10) Patent No.: US 7,133,617 B2
(45) Date of Patent: Nov. 7, 2006

(54) REFLECTION DETECTION IN AN OPTICAL WIRELESS LINK

(75) Inventors: Eric Gregory Oettinger, Rochester, MN (US); Mark David Heminger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 725 days.

(21) Appl. No.: 10/056,688

(22) Filed: Jan. 24, 2002

(65) Prior Publication Data

US 2002/0097472 A1    Jul. 25, 2002

(51) Int. Cl.
*H04B 10/00* (2006.01)

(52) U.S. Cl. .................. 398/123; 398/118; 398/122
(58) Field of Classification Search ......... 398/118–131
See application file for complete search history.

(56) References Cited

U.S. PATENT DOCUMENTS

| | | | | |
|---|---|---|---|---|
| 4,402,090 A | * | 8/1983 | Gfeller et al. | 398/119 |
| 5,142,400 A | * | 8/1992 | Solinsky | 398/129 |
| 5,592,320 A | * | 1/1997 | Wissinger | 398/121 |
| 6,714,336 B1 | | 3/2004 | Orcutt et al. | 359/290 |
| 6,915,080 B1 | | 7/2005 | Heminger et al. | 398/129 |

OTHER PUBLICATIONS

U.S. Appl. No. 09/839,690, filed May 9, 2002, Keller, Robert.
U.S. Appl. No. 09/923,570, filed Dec. 5, 2002, Christiansen, Grant.
U.S. Appl. No. 09/955,540, filed Mar. 21, 2002, Dewenter, William.

* cited by examiner

*Primary Examiner*—Agustin Bello
(74) *Attorney, Agent, or Firm*—William B Kempler; W. James Brady; Frederick J. Telecky, Jr.

(57) ABSTRACT

In an optical wireless network, where light beams are transmitted over-the-air, reflections of the transmitted light beams may cause a receiver of an optical wireless device to detect and subsequently lock onto the signal that it transmitted. By doing so, the network is effectively broken. A method and apparatus to detect the reception of reflected signals using minimal additional hardware and data is presented. Should a reflected signal be detected, the receiver is prevented from locking onto the signal, allowing the receiver to detect and subsequently lock onto light beams originating from other optical wireless devices.

17 Claims, 5 Drawing Sheets

REFLECTION DETECTION IN AN OPTICAL WIRELESS LINK

CROSS REFERENCE TO RELATED APPLICATION

The following co-pending, co-assigned patent applications are related to the present invention. Each of the applications is incorporated herein by reference.

| Ser. No. | Filing Date | Attorney Docket |
| --- | --- | --- |
| 60/234,081 | 9/20/2000 | TI-31444 |
| 60/233,851 | 9/20/2000 | TI-31612 |
| 09/839,690 | 4/20/2001 | TI-31429 |
| 09/923,510 | 8/6/2001 | TI-31440 |
| 60/285,461 | 4/20/2001 | TI-32924 |

FIELD OF THE INVENTION

This invention relates generally to optical wireless communications, and more specifically, to detecting self-reflections of transmissions on optical wireless links.

BACKGROUND OF THE INVENTION

Modern data communications technologies have greatly expanded the ability to communicate large amounts of data over many types of communications facilities. This explosion in communications capability not only permits the communications of large databases, but has also enabled the real-time (and beyond) digital communications of audio and video content. This high bandwidth communication is now carried out over a variety of facilities, including telephone lines (fiber optic as well as twisted-pair), coaxial cable such as supported by cable television service providers, dedicated network cabling within an office or home location, satellite links, and wireless telephony.

Each of these conventional communications facilities involves certain limitations in their deployment. In the case of communications over the telephone network, high-speed data transmission, such as that provided by digital subscriber line (DSL) services, must be carried out at a specific frequency range so as to not interfere with voice traffic, and is currently limited in the distance that such high-frequency communications can travel. Of course, communications over "wired" networks, including the telephone network, cable network, or a dedicated network, requires the running of the physical wires among the locations to be served. This physical installation and maintenance is costly, as well as limiting to the user of the communications network.

Wireless communication facilities overcome the limitation of physical wires and cabling, and provide great flexibility to the user. Conventional wireless technologies involve their own limitations, however. For example, in the case of wireless telephony, the frequencies at which communications may be carried out are regulated and controlled. Furthermore, current wireless telephone communication of large data blocks, such as video, is prohibitively expensive, considering the per-unit-time charges for wireless services. Additionally, since it is common to have multiple users within a certain frequency range, wireless telephone communications are subject to interference among the various users within the nearby area. Radio frequency data communication must also be carried out within specified frequencies, and is also vulnerable to interference from other transmissions and sources of noise. Additionally, radio frequency communications is inherently insecure. This is due to the uncontained propagation of the signals. Satellite transmission is also currently expensive, particularly for bi-directional communications (i.e., beyond the passive reception of television programming).

A relatively new technology that has been proposed for data communications is the optical wireless network. According to this approach, data is transmitted by way of modulation of a light beam, in much the same manner as in the case of fiber optic telephone communications. A photo-receiver receives the modulated light, and demodulates the signal to retrieve the data. As opposed to fiber optic-based optical communications, however, this approach does not use a physical wire for transmission of the light signal. In the case of directed optical communications, a line-of-sight relationship between the transmitter and the receiver permits a modulated light beam, such as that produced by a laser, to travel without the use of an optical fiber as a waveguide. Optical wireless communications is inherently secure because in order to snoop on the transmission, the transmission would need to be broken. A broken transmission link is readily detected.

It is contemplated that the optical wireless network according to this approach will provide numerous important advantages. First, high frequency light can provide high bandwidth, for example ranging from on the order of 100 mega-bits-per-second (Mbps) to several giga-bits-per-second (Gbps), when using conventional technology. Additionally, this high bandwidth need not be shared among users, when carried out over line-of-sight optical communications between transmitters and receivers. Without other users on the link, of course, the bandwidth is not limited by interference from other users, as in the case of wireless telephony. Modulation can also be quite simple, as compared with multiple-user communications that require time or code multiplexing to permit multiple simultaneous communications. Bi-directional communication can also be readily carried out according to this technology. Finally, optical frequencies are currently not regulated, and as such no licensing is required for the deployment of such networks.

These attributes of optical wireless networks make this technology attractive both for local networks within a building, and also for external networks between buildings. Indeed, it is contemplated that optical wireless communications may be useful in data communication within a room, such as for communicating video signals from a computer to a display device, such as a video projector.

It will be apparent to those of ordinary skill in the art of the present invention that reflections of transmitted light beam from stray surfaces present in the operating environment of the optical wireless network may present themselves as a potential source of concern and compensation for such reflections is of importance to this technology. In fact, should a reflection be detected by an optical sensor of the transmitter that is the source of the transmission, it is possible for the transmitter to consider the reflection as a light beam from another transmitter and lock onto to the reflection of its own origin. Particularly for laser-generated collimated beams, which are particularly intense (i.e., high transmitted power with a small cross sectional area), reflections from stray surfaces may present many images of the transmitted signal with sufficient strength to affect system performance. Especially considering that in many contemplated applications of this technology, the transmitted light beam is transmitted through transparent plastic covers or through glass windows, many possible reflective bodies are present throughout the operating environment of the optical wireless network, providing many reflections of the transmitted light beams.

Therefore, a need exists in the art for an optical wireless link that can detect and determine reflections of its own transmitted light beam and to prevent the optical wireless link from locking onto the reflections.

SUMMARY OF THE INVENTION

In one aspect, the present invention provides a method for detecting the type of light beams received by an optical wireless link comprising the steps of receiving a light beam through the use of a photodetector of the optical wireless link, demodulating the encoding of the data being carried on the received light beam, parsing the demodulated data, determining the origin of the demodulated data based on the parsing of the data, and permitting a signal lock if the origin of the received light beam is different from the optical wireless link containing the photodetector.

In another aspect, the invention provides for a method of communicating between two data devices. The method includes coupling a first data device to a first optical wireless device, coupling a second data device to a second optical wireless link, and aligning the first and second optical wireless links. The aligning step includes detecting a first light beam at the second optical wireless device, determining the origin of the first light beam, echoing a first position information back to the first optical wireless device if the origin of the first light beam is different from the second optical wireless device, detecting a second light beam at the first optical wireless device, determining the origin of the second light beam, echoing a second position information back to the second optical wireless device if the origin of the second light beam is different from the first optical wireless device, aligning the first light beam to a position indicated by the second echoing step, and aligning the second light beam to a position indicated by the first echoing step. The method also includes communicating data between the first and second data devices over the first and second light beams, subsequent to the aligning steps.

The present invention provides a number of advantages. For example, use of a preferred embodiment of the present invention permits the detection of a reflected light beam by a receiver where the light beam originated from a transmitter that is part of the same optical wireless link as the receiver with a minimum of additional computational and data overhead.

Also, use of a preferred embodiment of the present invention does not require the addition of any data not already present in a normal network installation of the optical wireless network or which cannot be pre-calculated and stored, therefore, the computation or generation of additional data is not required.

Additionally, use of a preferred embodiment of the present invention adds very little additional data to that which is already being transmitted, therefore, the time required to transmit the additional data is minimal.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

Figure 1:
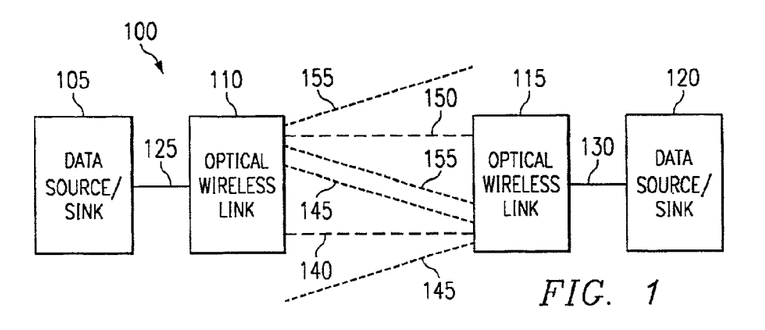
FIG. 1 illustrates a wireless optical networking system with two optical wireless links according to a preferred embodiment of the present invention.

FIG. 1 illustrates a preferred embodiment optical wireless system 100, including a first data source/sink 105 connected to a first Optical Wireless Link ("OWL") 110. The OWL 110 can both transmit to and receive data from a second OWL 115 over a wireless optical path. The second OWL 115 is in turn connected to a second data sink/source 120. Preferably each OWL device is an optical path-to-sight modem. As used herein, the term path-to-sight is intended to mean an unobstructed optical path (which may include reflections) generally through the ether, as contrasted with through an optic fiber whose path is controlled by the optical fiber. An advantageous feature of the OWL devices is that the optical beam is a narrow, collimated light beam, such as provided by a laser or collimated laser diode. The narrow beam allows for a lower power laser source to be used, because the optical power is concentrated in a small area. While this provides an advantage in terms such as eye safety and lower power consumption, it provides a commensurate disadvantage that it is difficult to align the collimated light beam to the receiving photodetector (due to the relatively small beam size). This disadvantage becomes more pronounced as the distance between the two OWLs increases, since a small angular misalignment becomes more pronounced as the overall beam length is increased.

Data sink/sources 105 and 120 could be any type of data device, such as a computer, a LAN network, an Ethernet device, a multi-media distribution source, a music player, a video projector or television, a telephony device or switch, and the like. Data sink/sources 105 and 120 communicate with OWLs 110 and 115, respectively over a data connections 125 and 130, respectively. These data connections (e.g., twisted pair, coaxial cable, fiber optic) are typically physical connections operating under a standard protocol, such as Ethernet, TCP/IP, ATM, and the like. Data connections 125 and 130 could also be radio frequency (RF) based wireless connections in some applications. Alternatively, OWLs may connect directly with data sink/sources via a communications bus interface. For example, an OWL with a PCI bus interface may be inserted into an empty PCI bus slot on the motherboard of a personal computer.

The OWL 110 communicates with the OWL 115 over a collimated light beam 150. The OWL 110 has a field of view 155 and the receiver of the OWL 115 must be positioned within the field of view 155 for effective communication. Likewise, the OWL 115 has a field of view 145 in which it can transmit a collimated light beam 140 to the receiver of the OWL 110. Inherently, the signal-to-noise ratio (SNR) is maximized when the light beams 140 and 150 are centered on the photo-receivers of the receiving units 110 and 115, respectively. The alignment of the light beam can be detected and measured by the OWL 115, and this detected alignment information can then be fed back to the transmitter. According to a preferred embodiment of the present invention, there is a mechanism for controllably steering the light beam. In addition to data from data source/sink 120, the OWL 115 transmits the light beam alignment feedback signals to the OWL 110 over light beam 140. Likewise, the OWL 110 transmits beam alignment feedback signals to the OWL 115 over its light beam 150, in addition to data from data source/sink 105. Because light beams 140 and 150 are high bandwidth, low latency paths, the transmission of feedback signals over the beams allows for rapid alignment of the beams (low latency) without degrading the data handling capabilities of the system (high bandwidth). In the preferred embodiments, the OWL devices 110 and 115 communicate with each other using standard 100 Mbps Ethernet protocol. The inventive concepts described herein apply equally to other communication protocols, including but not limited to ATM, TCP/IP, SONET, IEEE 1394, IRDA, 10 Mbps Ethernet, Gigabit Ethernet, and other alternatives within the purview of one of ordinary skill in the art of the present invention.

Details regarding the apparatus and method for communicating alignment control signals between the OWLs 110 and 115 are provided in co-pending, commonly assigned patent application, Ser. No. 09/923,510, entitled "System and Method for Embedding Control Information within an Optical Wireless Link", file Aug. 6, 2001 and incorporated herein by reference.

In the preferred embodiments, the OWL 110 and the OWL 115 are mounted to respective fixtures for operation. Examples of fixture might include affixing an OWL within the housing of a personal computer, mounting an OWL to a wall with a bracket, positioning an OWL on a counter-top, desk-top, or other work surface, mounted on a cubical wall, and the like. The primary requirement for the fixture is that it affixes the OWL relatively stably in the proper position vis-à-vis another OWL with which it is desired to communicate over line-of-sight beams 140 and 150. A first level of alignment is provided by positioning the OWLs 110 and 115 in their respective fixtures such that the two devices have their beam transmitters generally pointing toward each other, as shown in FIG. 1. Although a fixture is preferable in order to minimize the likelihood that the OWL will be moved out of alignment, it is not necessary for the teachings of the present invention that a fixture be employed. In some embodiments, the OWL will be simply placed on a work surface and pointed in the direction of a remote OWL. One skilled in the art will recognize that care should be taken to ensure that the OWL will not be unduly disturbed or moved during operation.

Figure 2:
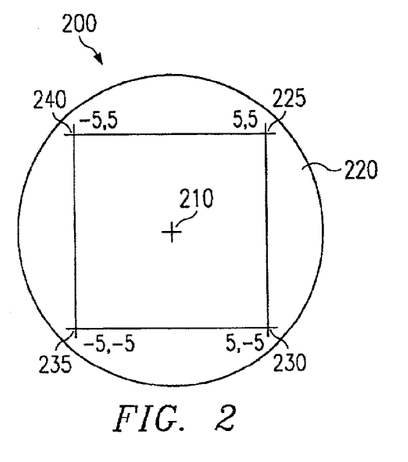
FIG. 2 illustrates a field of view of an optical wireless link according to a preferred embodiment of the present invention.

In the preferred embodiments, each OWL has beam steering capability providing a field of view 200 of ten degrees in both an X-axis and a Y-axis, as shown in FIG. 2. This beam steering capability is preferably provided by a micromirror that can be controlled via microactuators. However, the actual light beam transmitter itself may be steerable.

The neutral, or default position for the light beam is in the center of the field of view, as indicated by point 210. The beam can be deflected as much as five degrees along the X-axis, in either direction, and as much as five degrees in either direction along the Y-axis. Hence, point 225 illustrates the beam having been deflected five degrees positively along the X-axis and five degrees positively along the Y-axis. Point 230 illustrates where the light beam would point when it is deflected five degrees positively along the X-axis and five degrees negatively along the Y-axis. Likewise, point 235 illustrates where the light beam would point when it has been deflected five degrees negatively in both the X- and Y-axes, and point 240 illustrates the beam having been deflected five degrees negatively in the X-axis and five degrees positively in the Y-axis. Of course, the beam could be deflected less than five degrees in either direction, and hence the beam could be deflected to point anywhere within the field of view 200.

Also shown in FIG. 2 is the field of view 220 of receiving OWL 115. This represents the area for which the photodetector of the receiving OWL can detect an incoming light beam. Because the photodetector of the receiving device has a round field of view, the light beam deflection will preferably be limited to an area within the round area 220. According to a preferred embodiment of the present invention, the field of view 220 of receiving OWL 115 should be larger than the area covered by the light beam deflection.

A co-pending patent application Ser. No. 60/285,461, filed Apr. 20, 2001, entitled "Method and apparatus for aligning optical wireless links", commonly assigned herewith and incorporated herein by this reference, discloses a method for aligning optical wireless links. The patent application discloses a method wherein two optical wireless links are grossly aligned with each other so that each OWL's photodetector lie within the field of view of the other OWL. Each OWL then begins by sweeping its beam in an expanding spiral pattern. The spiral pattern continues to increase until it has expanded to its maximum diameter, at which point, the beam is swept through a decreasing spiral pattern. At some point, the light beam from one OWL will impinge upon the photodetector of the other OWL and positional data is exchanged. After light beams from both OWLs impinge on the photodetector of the other OWL, the shared positional data is used to grossly align the light beam of the two OWLs.

Figure 3:
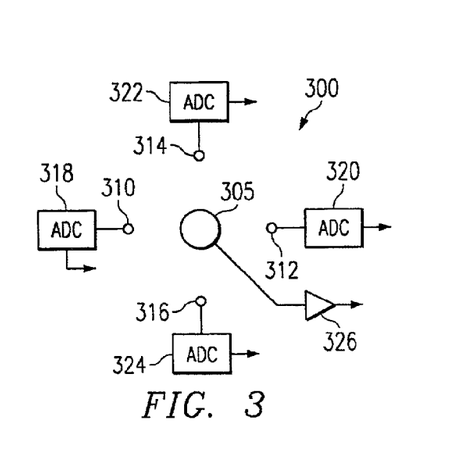
FIG. 3 illustrates an arrangement of photodetectors of an optical wireless link according to a preferred embodiment of the present invention.

FIG. 3 schematically illustrates a preferred embodiment photodetector, such as would be employed in the optical module 210 of OWLs 110 and 115. The photodetector comprises a data detector 305 and four servo detectors, two along the X-axis and two along the Y-axis and identified by reference numerals 310, 312, 314, and 316, respectively. Data detector 305 is preferably a Si PIN detector and is connected to a pre-amplifier 326 where the received signal is amplified before being passed to signal amplifying and processing circuitry (not shown) as is well known to those skilled in the art. Servo detectors 310–316 are preferably low bandwidth light-to-voltage converters containing an integrated amplifier such as a TAOS 254. Each servo detector is coupled to an analog to digital converter where the intensity of the light impinging upon the associated servo detector is converted into a digital value proportionate to the light intensity. By comparing the digital values from ADCs 318, 320, 322, and 324 (corresponding to the light intensity at servo detectors 310, 312, 314, and 316, respectively), the alignment of the impinging light beam relative the centrally located data detector can be determined. As an example, assuming the value being received from ADC 322 is higher than the value being received from ADC 324, this would indicate that the light beam is misaligned and in impinging above the center of data detector 305. By feeding this information back to the transmitter, as described above, the beam can be re-positioned to impinge lower upon data detector 305. Likewise, if the value being received from ADC 324 is higher than for ADC 322, this would indicate that the beam is too low and needs to be adjusted upwards. As discussed above, these parameters are fed back to the transmitting unit wherein the light beam is re-directed to more precisely align the beam.

Figure 4:
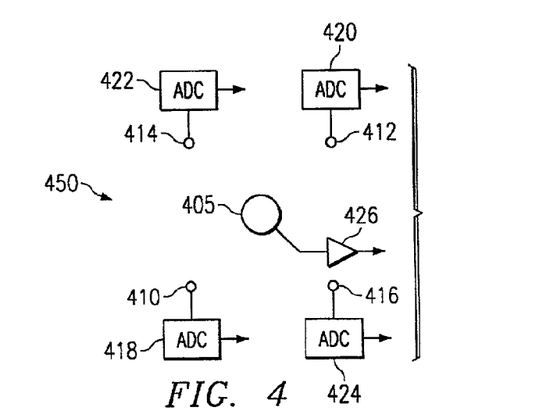
FIG. 4 illustrates an alternative arrangement of photodetectors of an optical wireless link according to a preferred embodiment of the present invention.

FIG. 4 illustrates another preferred embodiment configuration for the photodetector, wherein the servo detectors are located on 45° C. axes relative the centrally located data detector 405. This configuration is preferable in that all four detectors can be used for determining the alignment in the X-axis and also for determining alignment in the Y-axis. In other words, under the configuration illustrated in FIG. 4, the relative value of both servo detectors 416 and 412 compared to both 414 and 410 would be used for alignment in the X direction, and the relative value of servo detectors 414 and 412 to servo detectors 416 and 410 would be compared for alignment in the Y direction.

Alignment information transmitted in an alignment control packet over the light beam carries information relative to alignment. For example, each control packet can carry the position of the transmitting beam and any known information regarding the other OWL's light beam. Eventually, light beams from both OWLs will impinge upon the photodector of the other OWL and positional information regarding each OWL will be shared. At this point, the two OWLs will be nominally aligned.

Once the two OWL's light beams become nominally aligned, data transmissions may begin. Although the OWLs have become aligned, it is still possible for the OWLs to lose alignment, perhaps through vibrations, shocks, or other jarring. To help maintain alignment, packets containing positional information are periodically exchanged and the OWLs make adjustments to maintain alignment. These packets are referred to as position information packets.

Figure 5A:
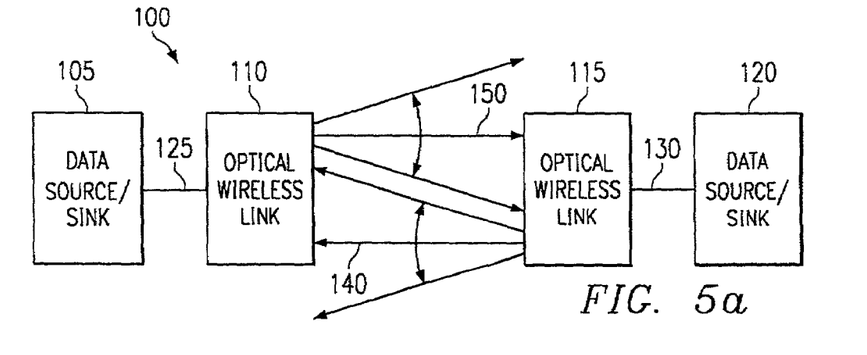
FIGS. 5a–c illustrate a sequence of steps in aligning the light beam transmitters for a wireless optical networking system with two optical wireless links according to a preferred embodiment of the present invention.
Figure 5B:
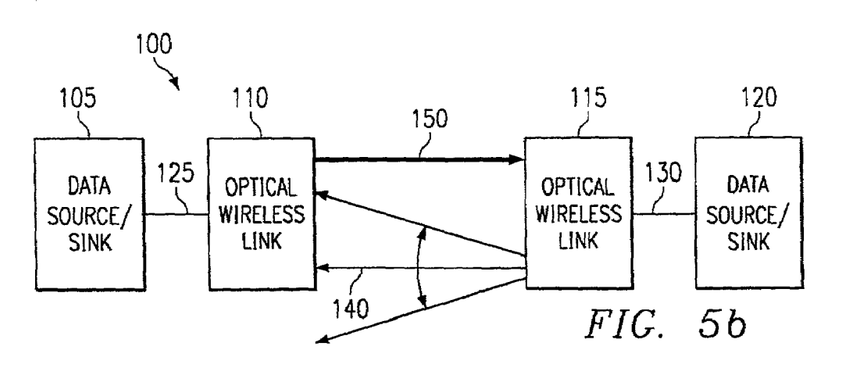
Figure 5C:
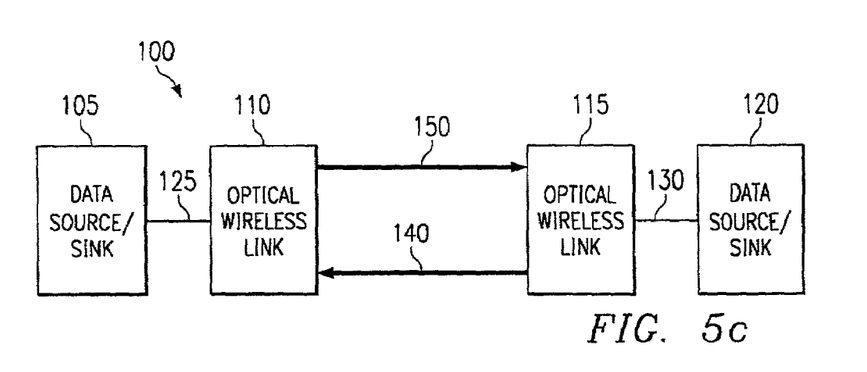

Referring now to FIGS. 5a–c, a series of diagrams illustrate the alignment process between two OWLs 110 and 115 in an optical wireless network 100. FIG. 5a displays the two OWLs 110 and 115 at the initiation of the alignment process when neither of OWL's light beam 140 and 150 has impinged upon the other OWL's photodetector. Each OWL's light beam 140 and 150 moves through its prespecified scan pattern, which is preferably a spiral pattern of constantly increasing (and then decreasing) size. However, other scan patterns, such as a raster pattern or an increasing (and then decreasing) rectangular pattern, as well as other regular patterns that provide adequate coverage of the field of view are also usable.

Referring now to FIG. 5b, a diagram illustrates an intermediate step in the alignment process between two OWLs 110 and 115 in an optical wireless network 100. In FIG. 5b, the light beam 150 from OWL 110 has impinged upon the photodetector of OWL 115 and positional information regarding OWL 110 has been provided to OWL 115 via an alignment control packet. However, light beam 140 from OWL 115 has not impinged upon the photodectector of OWL 110.

Referring now to FIG. 5c, a diagram illustrates another intermediate step in the alignment process between two OWLs 110 and 115 in an optical wireless network 100. In FIG. 5c, light beam 140 from OWL 115 has impinged upon the photodetector of OWL 110 and positional information regarding OWL 115 has been provided to OWL 110 via an alignment control packet. Along with the information previously provided when light beam 150 impinged upon the photodetector of OWL 115, the two OWLs 110 and 115 have become nominally aligned.

The operating environment in which the OWLs are placed may not be conducive to the proper operation of the wireless optical network. For example, often the housing that is used to hold the OWLs can provide a highly reflective surface for light beams from other OWLs to reflect from. Additionally, should a glass window or wall lie between two OWLs or behind or beside an OWL, the glass and wall can become a highly reflective surface. Other surfaces in the operating environment can readily reflect light beams coming from the OWLs.

Should the reflected light beam reflect back and impinge upon the photodetector of the OWL that sources the light beam, it is possible for the OWL to become locked upon its own light beam. If this happens, the OWL becomes useless since at the very best, it is communicating only with itself and the data communications link between the two OWLs cannot be established.

Figure 6A:
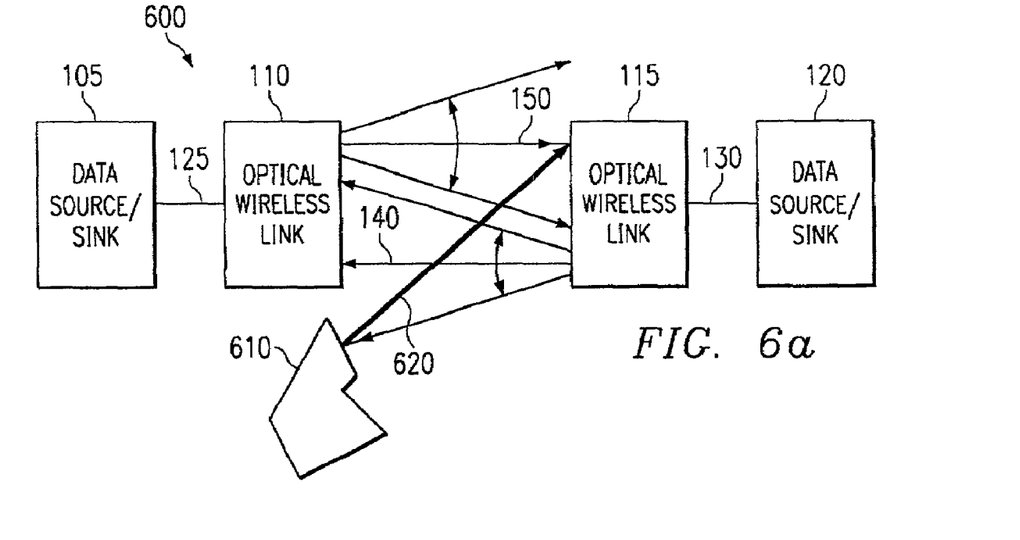
FIGS. 6a and 6b illustrate a sequence of steps in aligning the light beam transmitters for a wireless optical networking system with two optical wireless links with the presence of a reflective body in close proximity to one optical wireless link according to a preferred embodiment of the present invention.
Figure 6B:
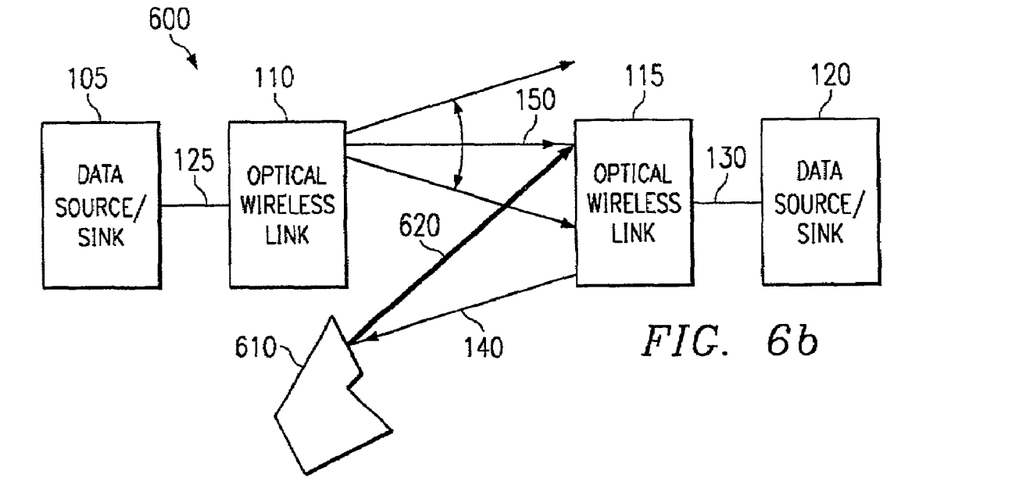

Referring now to FIGS. 6a and 6b, diagrams illustrate the detrimental effect of an OWL locking onto its own reflected light beam according to a preferred embodiment of the present invention. FIG. 6a displays a wireless optical network 600 comprised of two OWLs 110 and 115. The OWLs are in the initial stages of aligning their light beams 140 and 150. In the operating environment of the optical wireless network 600 is a reflective surface (or body) 610. The reflective surface 610 happens to lie within the range of movement of the light beam 140 of OWL 115.

As the OWL 115 moves its light beam 140 through the prespecified scan pattern, the light beam 140 impinges upon the reflective body 610. The reflective body 610 reflects the light beam 140 (reflected beam 620) to the photodetector of the OWL 115. The photodetector detects the reflected beam 620 and mistakens it for a light beam from another OWL (for example, the OWL 110) and processes the positional data carried on the reflected beam 620 as if it was actually a light beam from another OWL. OWL 115 then erroneously completes the alignment process using this improper reflected light beam.

Referring now to FIG. 6b, OWL 115 has aligned with the reflected light beam 620 of its own light beam. However, OWL 110 has not completed its alignment process. OWL 110 will continue the alignment process by scanning its light beam 150 through the prespecified scan pattern and attempting to detect a light beam impinging on its photodetector. However, because OWL 115 has already become aligned, OWL 110 will not be able to become aligned. With OWL 115 being aligned with what it thinks is a light beam from another OWL, but is in fact its own reflected signal, the optical wireless network 600 is not complete and data cannot be directly transferred between OWL 110 and OWL 115.

An underlying cause of an OWL locking onto a reflected light beam of its own origin is that the OWL cannot or does not determine the source of the light beam. According to a preferred embodiment of the present invention, a solution to the problem of an OWL aligning itself with a reflected light beam of its own origin is to monitor the positional data and other data included in the alignment control packet. The data is then compared with data received on the photodetector. Should the data match, then the likelihood of the light beam being a reflected light beam is high.

Figure 7A:
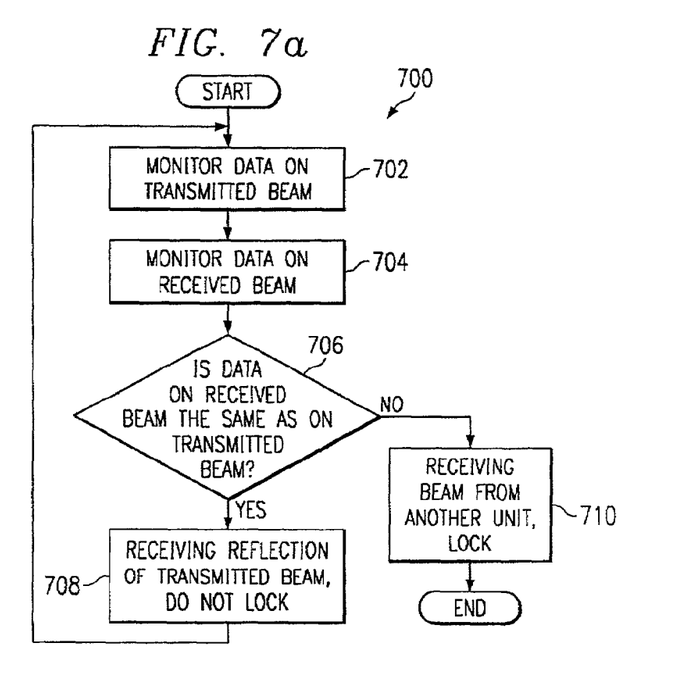
FIG. 7a–c illustrate algorithms for determining if a received light beam is a reflected light beam from the same optical wireless link according to a preferred embodiment of the present invention.

Referring now to FIG. 7a, a flow diagram illustrates an algorithm 700 for determining if a detected light beam is a reflected light beam according to a preferred embodiment of the present invention. According to a preferred embodiment of the present invention, the algorithm 700 executes on a processing unit of an OWL. The algorithm 700 is executed when the OWL is in alignment mode. As stated previously, an OWL is in alignment mode when it is initially powered on or when an established link is disrupted. According to another preferred embodiment of the present invention, after an OWL has become aligned, the reflected light beam detection algorithm needs not be executed during subsequent packet transmissions. This is because unless the alignment with the light beam is lost entirely, the periodic position information packets are used to track the motion or fine-tune the lock on the light beam. Hence, it is unlikely that the OWL would select to lock onto a reflected light beam over the light beam with which it is currently locked.

The OWL begins by monitoring data being transmitted on its light beam (block 702). During alignment mode, data is carried in alignment control packets and includes, but is not limited to, the transmitting OWL's beam's positional data and the positional data of any light beams detected by the OWL's photodetector. Because the positional data of the light beam continually changes, the probability of two different light beams carrying the same alignment control packet is low. Since the data in the alignment control packet continually changes, the data must be continually monitored.

When the OWL's photodetector receives a light beam, it extracts the information being carried in the alignment control packet (block 704) and the OWL compares the received information with the information it has stored for its own transmission (block 706). If the received data is the same as the transmitted data, then the OWL determines that the received light beam is a reflection of its own transmission and will not allow an alignment to occur (block 708) and will continue to monitor the data being transmitted on the light beam (block 702) and compare any received data with the monitored data (block 704). If the received data is not the same as the transmitted data, then the OWL determines that the received light beam originated at a different OWL and will allow an alignment to occur (block 710). Once the OWL's own light beam is detected by another OWL's photodetector, the OWLs fix their light beams at the positions provided by the alignment control packets and the OWLs are nominally aligned.

The continual monitoring of the transmitted data stream can place unnecessary computational and storage loads on the OWLs. This is due to relatively frequent changes to the alignment control packets transmitted by the OWLs. When an updated alignment control packet is transmitted, it must be stored for use in comparison with a received alignment control packet.

According to another preferred embodiment of the present invention, a piece of data, unique to the OWL that is transmitting is appended to the light beam transmission. The unique piece of data may be a part of the alignment control packet, either inserted into an existing field of the packet or in a newly created field of the packet, or it may be an additional packet that is transmitted along with the alignment control packet during the alignment process. An advantage of using a unique piece of data is that it allows for easy identification of the source of the received light beam.

Figure 7B:
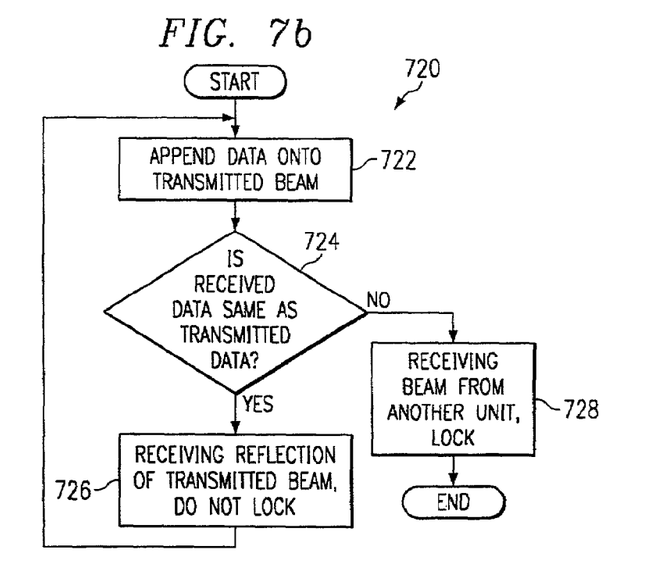

Referring now to FIG. 7b, a flow diagram illustrates an algorithm 720 for determining if a detected light beam is a reflected light beam using unique data according to a preferred embodiment of the present invention. According to a preferred embodiment of the present invention, each alignment transmission from an OWL contains a unique piece of data that is exclusive to that OWL only. The OWL appends the unique data onto the transmission (block 722). The OWL may place the unique data into an alignment control packet or it may transmit the unique data as another packet that is transmitted along with the alignment control packet.

When the OWL receives a transmission, it will look for the received unique data. If the received unique data is the same as its own unique data (block 724), then the received transmission is its own transmission and it does not lock onto the transmission (block 726) and returns to block 722 to repeat the algorithm 720 with the next transmission. If the received unique data is different from its own unique data (block 728), then the received transmission is from a different OWL and the OWL can begin the alignment process.

Figure 7C:
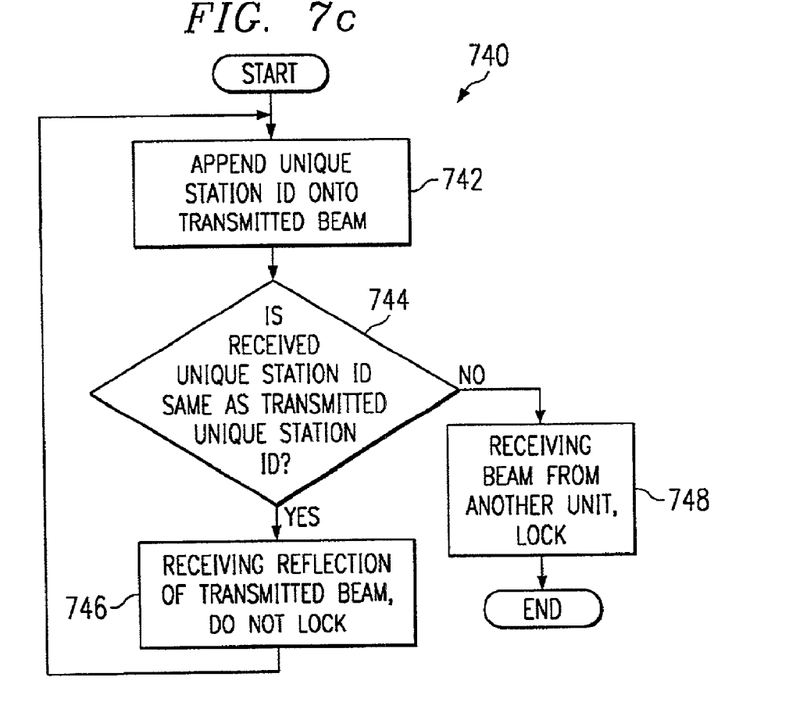

According to another preferred embodiment of the present invention, the unique data that is either transmitted inside the alignment control packet or in another packet along with the alignment control packet is the OWL's unique station identifier (ID). The ID is a unique identification number that is assigned to each OWL. The assignment of the ID may be done manually by a person installing the OWLs or it may be done automatically by an installation program. The ID may be dependent upon the type of network in which the OWLs are being installed or it may be consistent regardless of the type of network. The ID may also be a unique serial number assigned during the OWL's manufacture. FIG. 7c displays a flow diagram illustrating an algorithm 740 for determining if a detected light beam is a reflected light beam using a unique ID according to a preferred embodiment of the present invention.

Figure 8:
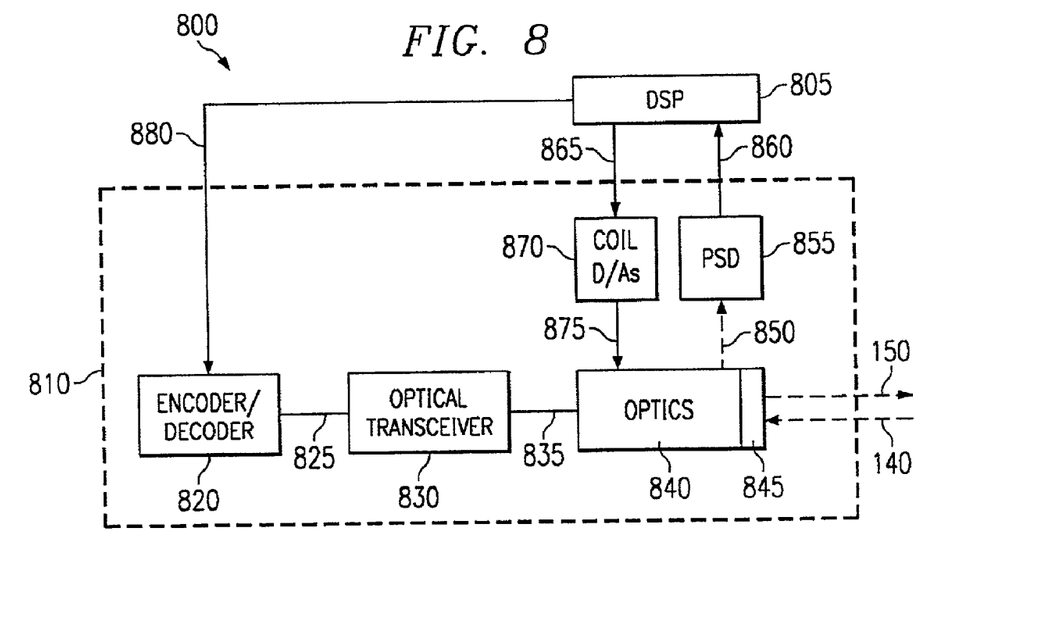
FIG. 8 illustrates an embodiment of an optical wireless link according to a preferred embodiment of the present invention.

One embodiment of an optical module 810 is provided in FIG. 8. The module includes an Encoder/Decoder Unit 820, coupled by a two-way Data Link 825 to an Optical Transceiver Unit (OTU) 830. The OTU 830 acts as an electrical to light and light to electrical converter. It contains a light source, such as a laser or light emitting diode, control electronics for the light source, a photo-detector for converting the received light to electrical signals and amplifiers to boost the electrical strength to a level that is compatible with the decoder.

The OTU 830 can also be of conventional design. For example, a TTC-2C13 available from TrueLight Corporation of Taiwan, R.O.C., provides an advantageous and low cost optical transceiver unit, requiring only a single +5V power supply, consuming low power, and providing high bandwidth. However, it should be noted that OTU units of conventional design can provide less than optimal performance, since such units are typically designed for transmitting and receiving light from fibers. This results in three problems that should be noted by the designer. First, light is contained in such units and is thus not subject to the same eye safety considerations as open air optical systems such as the present invention. Consequently, such units may have excessively high power. Second, light is transmitted to a fiber and thus has optical requirements that are different from those where collimation is required, as in embodiments of the present invention. Third, light is received by such units from a narrow fiber, and therefore such units usually have smaller detector areas than desired for embodiments of the present invention. Accordingly, it is considered preferable to assemble a transceiver having a photodiode and optical design such that the maximum amount of light is collected from a given field of view. This requires as large a photodiode as possible, with the upper limit being influenced by factors such as photodiode speed and cost. In any event, a preferred light source is a vertical cavity surface emitting laser, sometimes referred to as a VCSEL laser diode. Such laser diodes have, advantageously, a substantially circular cross-section emission beam, a narrow emission cone and less dependence on temperature.

The Optical Transceiver Unit 830 is coupled by a two-way data link 835 to Optics 840. The Optics 840 contains optical components for collimating or focusing the outgoing light beam 150 from the transceiver, a micro-mirror controlled by, e.g., electromagnetic coils, for directing the collimated light in the direction of a second OWL (not shown), with which OWL is in communication, and receiving optics to concentrate the light received from the second OWL on a transceiver photodetector included in the Optics 840. The receiving optics can include a control mirror, either flat or curved, to direct the light to the photodetector. Auxiliary photo detectors can be provided adjacent to the main photodetector for light detection in connection with a control subsystem (not shown), for controlling the control mirror, and maximize the light capture at the photodetector. The Optics 840 may also contain a spectral filter 845 to filter ambient light from the incoming signal light 140. The Optics 840 is preferably, but need not be a micro-mirror. Any controllable beam steering device can be used that changes the direction of the light beam without changing the orientation of the light emitter. In addition, a basic function of the Optics 840 is that it sufficiently collimates the light beam that will (1) substantially fit within the micro-mirror reflecting area, and (2) preserve the minimum detectable power density over the distance of the link. Laser diodes generally meet these criteria, and as such are preferred. However, light emitting diodes (LEDs) and other light sources can be made to satisfy these criteria as well.

For optical wireless links across large distances where the highest possible optical power density at the receiver is needed for robust transmission, the optical portion of the preferred embodiments should preferably be selected to achieve a divergence of approximately 0.5 mrad, which is to be contrasted with the prior art system that have divergences in the range of 2.5 mrad. The divergence of less than 0.5 mrad results in an optical density greater than 25 times the optical density of the prior art systems, which, for the same received optical power density corresponds to 5 or more times longer range.

The optical receiver portion of this embodiment should be selected to have an intermediate size, preferably having a diameter in the range of 0.5 millimeter (mm) to 1 centimeter (cm). If the diameter is much smaller than 0.5 mm, it may be difficult to collect enough of the light directed on the receiver. On the other hand, if the diameter is much larger than 1 cm, the responsiveness of the detector may diminish to the point where the performance of the system is compromised.

It should also be understood that more than one Optical Transceiver Unit 830 may be provided in some embodiments, for example to provide multiple wavelengths to transmit information across a single link, in order to increase the bandwidth of a given OWL link. This involves generating light beams having multiple wavelengths and collecting and separating these separate light beams. Numerous apparatus and methods are taught in co-pending patent application Ser. No. 09/839,690, filed Apr. 20, 2001 and incorporated herein by reference.

The Optics 840 are coupled by an optical path 850 to a Position Sensitive Detector ("PSD") 855. The PSD 855 measures the angular deflection of the micro-mirror in two planes. This can be accomplished by detecting the position of a spot of light on a sensor in the PSD 855. The analog signals representing these angular deflections are converted into signals and sent on lines 860 to a Digital Signal Processor ("DSP") 805 for closed loop control of the micro-mirror in Optics 840. PSDs are well known in the art, and PSD 855 may be any of a variety of types, including a single diode Si PSD, CMOS photo-detector array, and the like. All that is required of PSD 855 is that it senses, in two directions, the position of a spot of light impinging thereon, and provide as output digital signals representative of such position. However, note that the use of analog control signals is not required in the practice of the present invention. Other known control signal approaches can be used. For example, pulse-width modulation may be used to provide such control. Such choices of control system are well within the purview of those of ordinary skill in this art. A preferable approach to mirror position detection is to employ sensors on the actual micro-mirror itself, as described in greater detail in co-pending and commonly assigned patent applications No. 60/233,851 ("Packaged Mirror with In Package Feedback", filed Sep. 20, 2001) and 60/234,081 ("Optical Wireless Networking with Direct Beam Pointing", filed Sep. 20, 2001), which applications are incorporated herein by reference.

In addition to receiving the signal lines 860 from the PSD 855, the DSP 805 sends coil control signals on lines 865 to a set of digital to analog converters ("D/As") 870. The D/As 870 are, in turn, connected by way of lines 875 to a corresponding set of coils in Optics 840. Finally, the DSP 805 is connected via line 880 to send and receive Operational/Administration/Maintenance (OAM) data to/from Encoder/Decoder 820. The DSP 805 operates as a link control. It controls the micro-mirror deflections by controlling the coil currents through the D/As 870. Information on the instantaneous micro-mirror deflections is received from the PSD 855 for optional closed loop control. The DSP 805 also exchanges information to the second OWL to orient the beam steering micro-mirror in the proper direction for the link to be established and maintained. The DSP 805 may also exchange OAM information with the second OWL across the optical link maintained by Optical Module 840. DSP 805 may be any suitable DSP, of which many are commercially available. Preferably, the DSP is the DSP provided for by the control logic, as discussed above, although a second distinct DSP could optionally be used. In addition, note that a single processor may control multiple OWL links. This capability can be very valuable for use in a network hub, where multiple links originate or terminate in a single physical network switch. A single DSP could provide a very cost efficient control facility in such cases. In all such cases, the requirements for this processor are a sufficiently high instruction processing rate in order to control the specified number of micro-mirrors, and a sufficient number of input/output ("I/O") ports to manage control subsystem devices and peripheral functions.

For the purposes of reflection detection, the DSP 805 may be used to monitor the data being transmitted by the OWL. As previously discussed, a processing unit is responsible for executing the reflection detection algorithms (FIGS. 7a–c). According to a preferred embodiment of the present invention, the DSP 805 executes the reflection detection algorithm and its attendant processes. Accordingly, the DSP 805 has sufficient processing power to support any needed processing. Alternatively, an additional processing element (not shown) can be used to provide the reflection detection functionality. The additional processing element may be another DSP, a general purpose processor, a dedicated processor, an imbedded processor, or a custom designed functional unit.

A memory (not shown) is required to store either the unique identifier associated with the OWL, the unique data being appended onto the transmission, or the monitored data being transmitted. This memory should be sufficiently sized to store the unique identifier, the appended data, or the monitored data plus additional storage space required to store the received data to facilitate the determination of the origin of the received data. The memory may be an internal memory located in the processing element or the DSP 805 or it may be a part of a larger memory block that is a part of the OWL.

As an alternative to being implemented in software, the reflection detection algorithms (FIGS. 7a–c) may be implemented in hardware. As data is being prepared for transmission during the alignment process, the unique identifier or data can be appended to the data and then transmitted. Alternatively, the data being transmitted may be saved into a memory. Should a light beam be detected by the photodetector of the OWL, the data transmitted on the received light beam, after demodulation, may be compared against the stored transmitted data or may be searched for the unique identifier or data to determine if the received light beam is a reflection of the OWL's own transmitted light beam. The hardware implementation can be realized as simply as a comparator of adequate size and a memory of adequate size. The respective sizes being dependent upon the size of the data being transmitted and the size of the unique identifier or data.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for preventing signal lock onto a reflected light beam received by a photodetector of an optical wireless link, wherein the reflected light beam was transmitted by a light transmitter of the same optical wireless link comprising:

providing a steerable light beam transmitter;
receiving a light beam at the photodetector;
demodulating data carried on the received light beam;
parsing the demodulated data;
determining an origin of the demodulated data based on the parse; and
permitting signal lock if the origin of the received light beam is different from the steerable light beam wherein the optical wireless link is prevented from locking on to a reflected light beam originating from its steerable light beam transmitter.

2. The method of claim 1, further comprising the step of appending a unique identifier to data being transmitted on the light beam prior to transmission.

3. The method of claim 2, wherein the unique identifier is a network address of the optical wireless link transmitting the data.

4. The method of claim 3, wherein the network address is unique to the optical wireless link.

5. The method of claim 2, wherein the unique identifier is a uniquely calculated data value that is ensured of being unique to the optical wireless link transmitting the data.

6. The method of claim 2, wherein the parsing step comprises searching for the presence of the unique identifier in the demodulated data.

7. The method of claim 6, wherein the determining step comprises:
finding that the origin is different from the steerable light beam if the unique identifier is absent from the demodulated data; and
finding that the origin is the same as the steerable light beam if the unique identifier is present in the demodulated data.

8. The method of claim 1, further comprising the step of monitoring data transmitted on the light beam prior to transmission.

9. The method of claim 8, wherein the parsing step comprises comparing the demodulated data with the monitored data.

10. The method of claim 9, wherein the determining step comprises:
finding that the origin is different from the steerable light beam if the demodulated data and the monitored data are different; and
finding that the origin is the same as the steerable light beam if the demodulated data and the monitored data are the same.

11. The method of claim 1, further comprising the step of ignoring the received light beam if the origin of the demodulated data was the same as steerable light beam, subsequent to the determining step.

12. The method of claim 1, wherein the permitting signal lock step further comprises:
retrieving positional data from the demodulated data;
transmitting the positional data on a second light beam; and
aligning the light transmitter to the positional data received from the demodulated data.

13. An optical wireless link comprising:
a steerable light beam transmitter configured to transmit a first light beam;
a photodetector configured to receive a second light beam;
a processing element coupled to the light beam transmitter and the photodetector, the processing element containing circuitry to detect the origin of data received on the second light beam;
a reflection detection unit coupled to the photodetector, the reflection detection unit containing circuitry to detect the origin of the data received on the second light beam wherein the reflection detection unit prevents the optical wireless link from locking onto a reflection of the first light beam; and
a memory coupled to the reflection detection unit, the memory to store the received data.

14. The optical wireless link of claim 13, wherein the memory further stores a unique identifier used to detect the origin of the received data.

15. The optical wireless link of claim 13, wherein the memory further stores monitored data from transmissions originating from the optical wireless link.

16. The optical wireless link of claim 13, wherein the optical wireless link further comprises a memory coupled to the processing element, the memory to store the received data.

17. The optical wireless link of claim 13, wherein the first light beam is steered by a controllable micromirror.

* * * * *